May 19, 1959 F. C. HESTERMAN 2,887,146
FLUID OPERATED-APPARATUS FOR FORMING FLEXIBLE TUBING
Filed Nov. 19, 1954 2 Sheets-Sheet 1
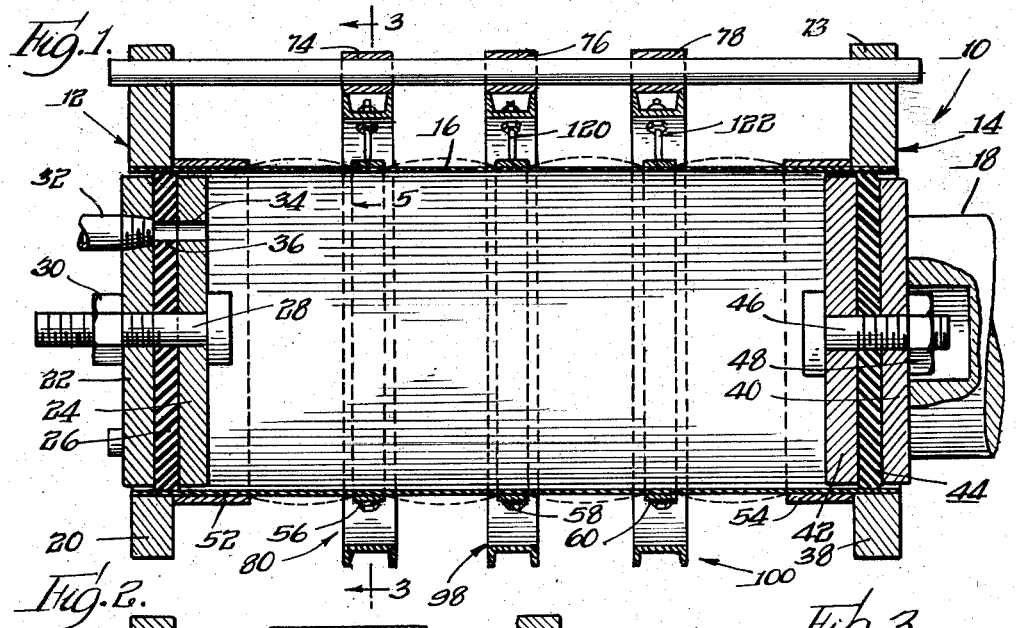
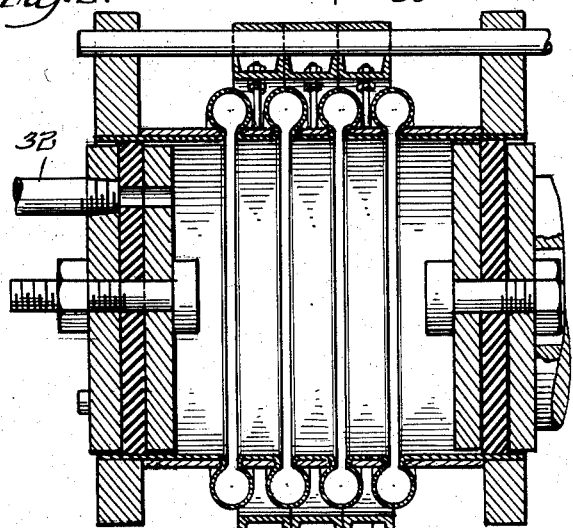
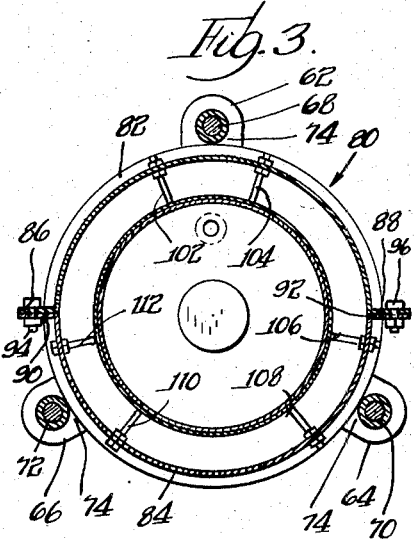
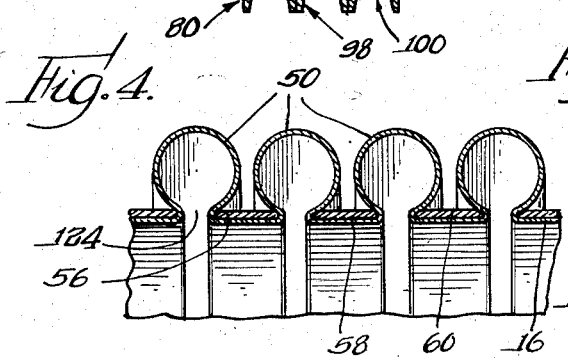
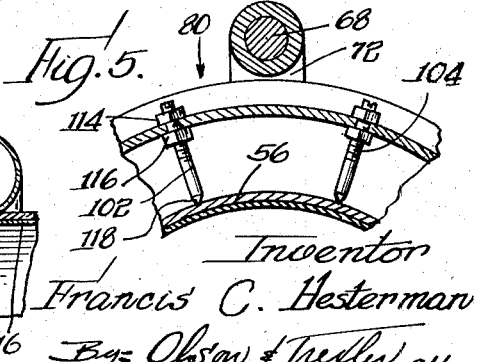
Inventor
Francis C. Hesterman
By Olson & Trexler attys

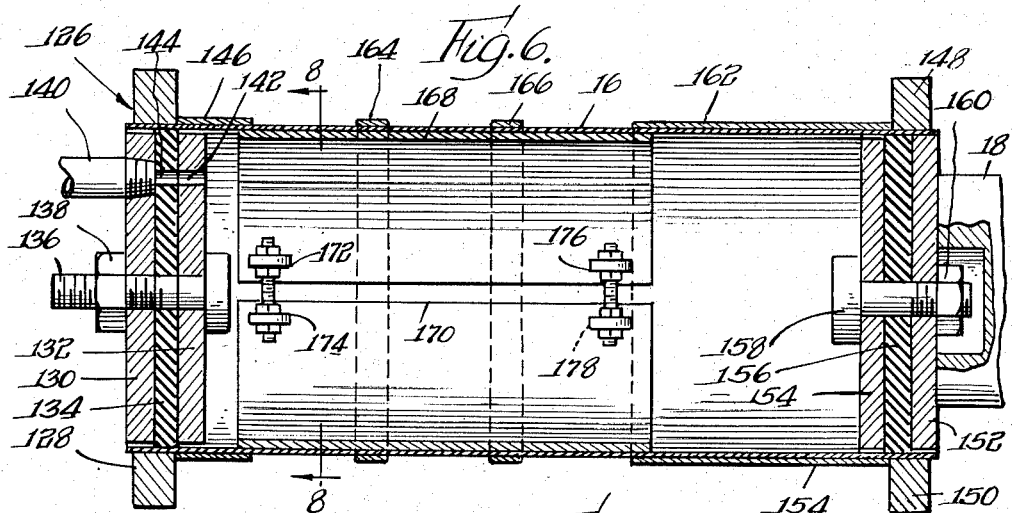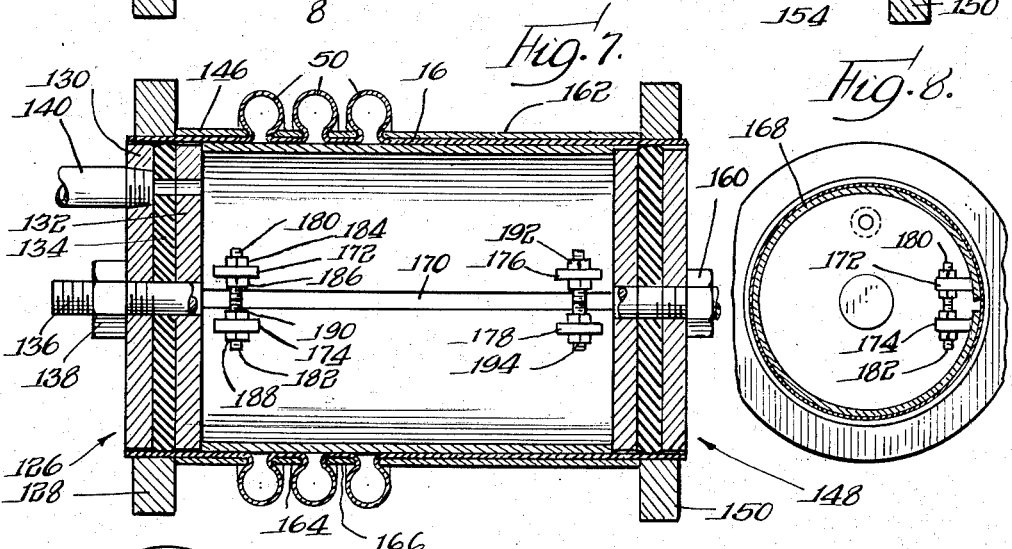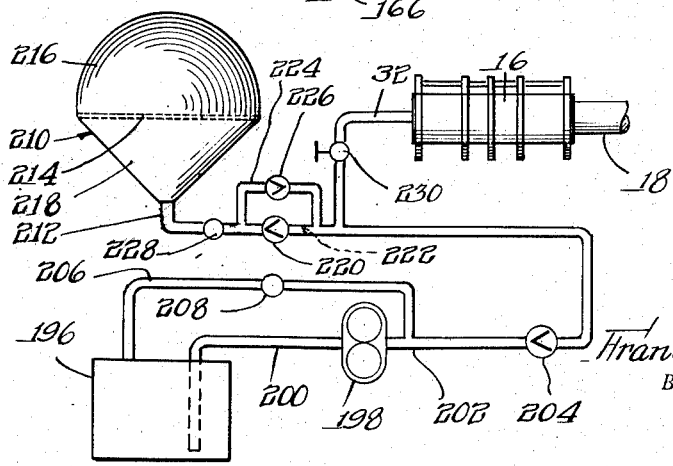

United States Patent Office 2,887,146
Patented May 19, 1959

2,887,146

FLUID-OPERATED APPARATUS FOR FORMING FLEXIBLE TUBING

Francis C. Hesterman, Elgin, Ill., assignor to Flexonics Corporation, Maywood, Ill., a corporation of Illinois Application November 19, 1954, Serial No. 469,982

5 Claims. (Cl. 153—73)

The present application relates to a novel apparatus for forming flexible corrugating tubing and more particularly, to a novel apparatus for forming reinforced nodal-type corrugated tubing.

It has been proposed to form nodal-type tubing by positioning a plurality of flat rings along a tube, subjecting the interior of the tube to the action of fluid under pressure to expand the tube between the rings and simultaneously axially collapsing the tube. Heretofore attempts to produce nodal-type tubing in accordance with prior proposals have not always resulted in satisfactory products since the tubing when acted upon by the hydraulic fluid and axially directed collapsing forces tends to undulate or buckle so that the nodoid bulges formed thereon are not in axial alignment.

It is an important object of the present invention to provide a novel apparatus for forming nodal-type tubing hydraulically, which apparatus is provided with means for guiding the tubing to prevent buckling or undulating thereof without interfering with the formation of the nodoid bulges or corrugations.

Another object of the present invention is to provide a novel apparatus for hydraulically forming corrugated tubing, which apparatus is constructed so as to be capable of maintaining a more uniform pressure within the tubing during bulging and collapsing thereof so as to eliminate hydraulic shocks which might burst the tubing and so as to provide for a more uniform stretching of the metal forming the corrugations.

Other objects and advantages of the present invention will become apparent from the following description and the accompanying drawings wherein:

Fig. 1 is a sectional view of an apparatus embodying the principles of this invention at the start of a tube corrugating operation;

Fig. 2 is a sectional view similar to Fig. 1 but showing the apparatus at the finish of a tube corrugating operation;

Fig. 3 is a cross sectional view taken along line 3—3 in Fig. 1;

Fig. 4 is an enlarged fragmentary sectional view of a reinforced nodal-type corrugated tube formed by the apparatus of this invention;

Fig. 5 is an enlarged fragmentary cross sectional view taken along line 5—5 in Fig. 1;

Fig. 6 is a cross sectional view similar to Fig. 1 but showing a modified form of the present invention;

Fig. 7 is a sectional view of the modified form of the apparatus at the finish of a tube corrugating operation;

Fig. 8 is a cross sectional view taken along line 8—8 in Fig. 6; and

Fig. 9 is a diagrammatic view showing the novel hydraulic system of the apparatus of this invention.

Referring now more specifically to the drawings wherein like parts are designated by the same numerals throughout the various figures, an apparatus 10 embodying one form of the present invention is shown in Figs. 1 through 3 and 5. The apparatus 10 includes fittings or sealing means 12 and 14 adapted to be applied to opposite ends of a tube 16 to be corrugated. In order to collapse the tube or conduit 16 axially in the manner described below, a suitable power operated ram 18 is provided for pressing against the end fitting 14, and suitable means, not shown, is provided for backing up the end fitting 12.

The end fitting 12 includes a heavy annular plate member 20 adapted to receive one end of the tube 16 in the manner shown. A plug including a pair of spaced metal plates 22 and 24 and an expandable resilient rubber-like disk 26 disposed between the plates is adapted to be positioned within the end of the tube. Means is provided for clamping the metal plates 22 and 24 against opposite sides of the resilient disk so that the periphery of the disk is expanded tightly against the interior surface of the tube which is backed up by the outer annular ring or plate 20 to seal the end of the tube. In the embodiment illustrated this means includes a bolt 28 and a nut 30 threaded on the bolt. The end of a hydraulic line 32 is threaded or otherwise connected with the plate 22 for communicating with the interior of the tube or conduit 16 through apertures 34 and 36 in the plate 24 and rubber-like disk 26, respectively.

In the embodiment illustrated the end fitting 14 is essentially similar to the end fitting 12. Thus, the end fitting 14 includes an annular plate member 38 adapted to receive an end of the tube or conduit 16 and plug means including a pair of metal plates 40 and 42 with a resilient rubber-like disk 44 disposed therebetween. Suitable means such as a bolt 46 and a nut 48 is provided for clamping the plates 40 and 42 together to expand the resilient disk into sealing engagement with the tube.

In order to form nodal-type corrugations 50 in the tube or conduit 16, a pair of annular bands or rings 52 and 54 is positioned around the tube with the ring 52 being disposed adjacent the end fitting 12 and the ring 54 adjacent the end fitting 14. In addition, a plurality of flat bands or rings 56, 58 and 60 is disposed on the tube between the rings 52 and 54. As will be understood, the rings 56, 58 and 60 should be equally spaced and the spacing of these rings and the number of these rings or similar rings to be used may be varied in accordance with the length of tubing to be corrugated. It should be noted that the annular bands have a relatively narrow radial cross sectional thickness so that they serve only to confine the portions of the tube surrounded thereby and do not interfere with the formation of the nodoid corrugations. Preferably, at least the bands 56, 58 and 60 are formed in one piece and they are left on the tube after it has been corrugated as shown best in Fig. 4 so as to reinforce the tube. The bands 52 and 54 may also be formed in one piece and if desired, they may be fixed to the annular plates 20 and 38, respectively. It is, of course, understood that the annular bands are positioned on the tube before the end fittings are applied to the tube. After the bands and the end fittings have been applied to the tube, the tube is subjected to internal hydraulic pressure and axial pressure in the manner described fully below so that the portions of the tube between the bands are formed into the nodal-type corrugations.

In accordance with the present invention, the apparatus 10 is provided with novel means for maintaining the annular bands in axial alignment during the corrugating operation whereby the nodal-type corrugations in the finished product will be in axial alignment with each other. More specifically, the annular plate member 20 is provided with a plurality of radially extending projections 62, 64 and 66 having apertures therethrough adapted to receive guide rods 68, 70 and 72, respectively, which guide rods extend parallel to the axis of the tube. Similarly, the annular plate member 38 is provided with radially extending projections 73, only one of which is shown, and these projections are also provided with apertures for receiving the guide rods. Thus, the guide rods serve to maintain the end fittings and, therefore, the opposite ends of the tube 16 in axial alignment with each other. When certain known presses are used, the end fittings may be mounted on or may form a part of opposite platens of the press and the guide rods will also serve to maintain the press platens in alignment, if necessary, or may merely serve to maintain the annular bands in alignment with the platens and end fittings. In order to maintain the annular bands 56, 58 and 60 in axial alignment with each other and with the end fittings, a plurality of sets of bushings 7, 76 and 78 is provided with one bushing of each set being slidably disposed on the guide rod 68 and the other bushings of each set respectively being slidably disposed on the guide rods 70 and 72. A relatively heavy and rigid ring 80 formed from channel stock is welded or otherwise secured to and supported by the bushings 74. As shown in Fig. 3, the ring 80 is preferably made in two sections 82 and 84 and the section 82 is welded to one of the bushings 74 while the section 84 is welded to the other two bushings 74. Apertured lug members 86 and 88 are fixed to opposite ends of the ring section 82 for alignment with similar apertured lug members 90 and 92 fixed to opposite ends of the ring section 84. The ring sections are conveniently detachably secured together by bolts 94 and 96 extending through the lugs 86—90 and 88—92, respectively. Suitable nut members are, of course, applied to the bolts. Heavy rings 98 and 100 are respectively welded or otherwise secured to the bushings 76 and 78, and since these rings are identical to the ring 80, they need not be described in detail.

As shown best in Fig. 3, a plurality of pairs of screws 102—104, 106—108 and 110—112 is carried by the ring 80 for positioning the band 56 so that it is concentric with the ring 80. The pairs of positioning screws are spaced equally around the ring 80 and are preferably located so that the screws of each pair are disposed adjacent to and at opposite sides of one of the bushings 74. The positioning screws 102 and 104 are shown in greater detail in Fig. 5 and since all of the positioning screws are identical, only the screw 102 and its associated elements, need be set forth with particularity. The screw 102 comprises an elongated threaded shank which extends through an aperture in the ring 80. A pair of nut members 114 and 116 are applied to the shank for adjusting the shank radially with respect to the ring 80 and locking the shank in the desired adjusted position. The inner end of the threaded shank or screw 102 is preferably pointed as at 118 in order to dig into the annular band 56 and prevent the band from slipping out of position. As will be understood, the band 56 is positioned and held concentric with the ring 80 by properly adjusting all of the positioning screws. The bands 58 and 60 are positioned and held concentric with the rings 98 and 100, respectively, by means of a plurality of positioning screws 120 mounted on the ring 98 and a plurality of positioning screws 122 mounted on the ring 100. These positioning screws are identical to and are arranged in the same manner as the screws on the ring 80 and, therefore, need not be described in detail.

With the elements of the apparatus 10 disposed as shown in Fig. 1, the process of corrugating the tube may be begun. This process is initiated by introducing hydraulic fluid under pressure into the interior of the tube through the hydraulic line 32. This causes the portions of the tube between the bands to bulge outwardly as indicated by the broken lines in Fig. 1. The initial outward bulging of the tube portions securely locks the annular bands against any possible axial movement relative to the tube so that axial collapsing of the tube may be begun. This axial collapsing is accomplished by operating the ram 18. As will be understood, the hydraulic pressure within the tube is maintained during the axial collapsing thereof so that the portions of the tube between the annular bands continue to bulge outwardly. Since these portions of the tube are not confined, they tend to assume the shape of the nodoid corrugations and this is permitted without undue stretching of the metal by the fact that the annular bands are relatively moved together during the axial collapsing of the tube to provide the corrugations with narrow throats 124. During the corrugating operation, the positioning screws retain the annular bands in axial alignment, and as shown best in Fig. 2, the positioning screws have relatively small diameters so that they may extend between adjacent nodoid corrugations without interfering with the formation of such corrugations.

In Figs. 6, 7 and 8 there is illustrated a modified form of the present invention. This embodiment includes an end fitting 126 which is similar to the above described end fitting 12. Thus, the fitting 126 includes an annular plate 128 and a plug comprising a pair of metal plate members 130 and 132 with a resilient rubber-like disk 134 disposed therebetween with a bolt 136 and nut 138 provided for clamping the plates against the resilient disk. The hydraulic power line 140 is connected with the disk 130 for communication with the interior of the tube through passageways 142 and 144 in the plate 132 and disk 134, respectively. An annular band 146 similar to the above described band 52 is secured to the annular plate 128. This embodiment also includes an end fitting 148 which corresponds to the above described end fitting 14. The fitting 148 includes an annular plate 150 adapted to be positioned over the end of the tube and plug means including a pair of metal plates 152 and 154, a resilient rubber-like disk 156 disposed between these plates, a bolt 158 and a nut 160 for clamping the plates against the resilient disk. An elongated annular band or sleeve 162 is secured to the annular plate 150. Annular bands 164 and 166 formed from flattened stock material are disposed over the tube and equally spaced between the end bands 146 and 162. As will be understood, the number of the bands similar to the bands 164 and 166 to be used may be varied in accordance with the length of the tube to be corrugated and the number of corrugations to be formed.

In the embodiment of Figs. 6 and 7, the above described guide bars and associated rings and positioning screws have been omitted and in order to prevent the tube from undulating during the corrugating operation, a cylindrical guide member 168 is positioned within the tube. The cylindrical guide member 168 is provided with a longitudinal extending slot 170 so that it may be collapsed for easy insertion into the tube 16 and then expanded to fit snugly within the tube. Preferably, the guide member is formed so that it normally has an external diameter less than the internal diameter of the tube and in order to adjust or expand the guide member to fit snugly within the tube, pairs of opposing lugs 172—174 and 176—178 are welded to opposite margins of the slot adjacent opposite ends of the guide member and adjusting screws are mounted on the lugs. More specifically, screws 180 and 182 extend through apertures in the lugs 172 and 174, respectively. A pair of nut members 184 and 186 is threaded onto the screw 180 with the nut members located at opposite sides of the lug 172 and nut members 188 and 190 are similarly disposed on the screw 182. As will be understood, the screw members 180 and 182 which are in axial alignment may be adjusted toward and away from each other to expand and contract the guide member. Similar screw and nut adjusting means 192 and 194 are provided on the lugs 176 and 178, respectively, and need not be described in detail.

When corrugating tube 16 with the apparatus shown in Figs. 6 and 7, hydraulic and axial pressures are applied to the tube in the manner described above. It will be appreciated that even though the guide member 168 fits snugly within the tube, the hydraulic fluid under pressure is able to pass between the guide member and the tube to expand the tube portions between the annular bands. It should be noted that the cylindrical guide member 168 is long enough so that it extends between and telescopes within the annular end bands 146 and 162 so that the end bands and the guide member cooperate to maintain all portions of the tube in axial alignment. As the tube is axially collapsed the guide member 168 and the end fittings are axially moved relative to each other so that further telescoping of the guide member and the end bands is effected as shown in Fig. 7. The combined length of the end bands 146 and 162 should be sufficient to permit this further telescoping action and while the end band or sleeve 162 has been illustrated as substantially longer than the band 146, it is understood that the relative lengths of these bands may be varied as desired as long as the minimum combined length is retained.

In the diagrammatic illustration of Fig. 9 the structure of Fig. 1 is shown connected with a novel hydraulic circuit and it is understood that in this assembly, the structure of Fig. 6 may be substituted for the structure of Fig. 1. The hydraulic circuit includes a reservoir 196 for hydraulic fluid and a pump 198 of known construction having its inlet connected with the reservoir by a conduit 200. The outlet of the pump is connected with a conduit 202, which conduit has a check valve 204 disposed therein and is connected with the power line 32. The pump is preferably a continuous operating positive displacement type pump and in order to prevent injury to the system, a fluid return line 206 is connected between the reservoir and the conduit 202 and a pressure relief valve 208 is disposed in the return line. In accordance with a feature of this invention, the hydraulic system is provided with a pressure accumulator 210 which is connected with the power line 32 by a conduit 212. The pressure accumulator may be of any known construction having a flexible diaphragm 214 separating an air chamber 216 from a hydraulic fluid chamber 218. A check valve 220 and a restricted orifice 222 are disposed in the conduit 212 and a conduit 224 is connected with the conduit 212 so as to by-pass the check valve and orifice. Another check valve 226 is disposed in the conduit 224 so that fluid may flow into the accumulator through the by-pass conduit 224 and the check valve 226 and out of the accumulator through the conduit 212, the check valve 220 and the restricted orifice 222. Preferably, a shutoff valve 228 is disposed in the conduit 212, which valve is normally adjusted to its fully opened position and may be shut to prevent draining of the accumulator when the various elements of the hydraulic system are disconnected for repairs or any other desired purpose. Another shutoff valve 230 is preferably provided in the power line 32.

The hydraulic system shown in Fig. 9 functions in the following manner. The power line 32 is, of course, first connected with the interior of the tube 16 through the end fitting, and the relief valve 208 is adjusted to open at the pressure desired for expanding the tube. Then with the shutoff valves 228 and 230 opened and the pump 198 running, fluid is pumped from the reservoir through the check valve 204, the power line 32 and into the tube 16. At the same time the fluid is pumped through the by-pass conduit 224 and the check valve 226 into the accumulator. When the pressure in the tube 16 and the accumulator is built up a predetermined amount, the relief valve 208 opens and fluid is directed from the pump back to the reservoir. However, the fluid in the tube and the accumulator is prevented from returning to the reservoir by the check valve 204. Then the ram 18 is actuated to collapse the tube axially. During axial collapsing of the tube a portion of the hydraulic fluid therein will be forced back through the power line 32, through the by-pass line 224 and into the accumulator. As the fluid enters the accumulator the diaphragm 214 will be stretched and the gas in the air chamber 216 will be compressed. The flow of fluid from the tube 16 to the accumulator is smooth and substantially uniform so that the tubing 16 is not subjected to momentary hydraulic shocks whereby any danger of injury to the tubing is reduced. As will be understood, the pressure of the hydraulic fluid in the tubing and the accumulator will increase as the gas in the air chamber 216 is compressed, but by constructing the accumulator so that the air chamber 216 has a volume which is substantially larger than the volume of the tube 16, this increase in pressure may be held to a permissible amount.

After the tube 16 has been completely formed, the valve 230 is closed to prevent draining of the system and the formed tube is disconnected from the power line 32. Then another tube to be formed may be connected with the power line and upon opening of the valve 230, the fluid which has been pushed from the previous tube into the accumulator is forced back out of the accumulator through the check valve 220 and the orifice 222 and finally through the power line 32 into the tube. When the pressure in the accumulator has been reduced to the predetermined pressure controlled by the relief valve 208, fluid from the pump 198 may again pass the check valve 204 and flow through the conduit 202, the power line 32 and into the tubing. Thus, it is seen that the accumulator not only serves to eliminate hydraulic shocks in the system and to maintain a substantially uniform pressure in the tubing during actual collapsing of the tubing, but it also serves to store the hydraulic fluid and then aid the pump in filling a subsequent tube. In the event the tube 16 should burst during the corrugating process, the orifice 222 functions to prevent the accumulator from forcing fluid back into the ruptured tube at a high velocity.

From the above description, it is seen that the present invention has provided a novel apparatus for forming reinforced nodal-type corrugated tubing in a manner which prevents the tubing from becoming undulated during the corrugating process. It is also seen that the present invention has provided a novel apparatus for corrugating tubing in a manner which reduces any possibility of injuring or bursting the tubing during the corrugating process since the hydraulic fluid within the tubing is maintained at a substantially uniform pressure and any pressure changes of the fluid are accomplished smoothly and without shock.

While the preferred embodiments of the present invention have been shown and described herein, it is obvious that many structural details may be changed without departing from the spirit and scope of the appended claims.

The invention is claimed as follows:

1. In an apparatus for hydraulically forming a plurality of nodal-type corrugations in a tube closely encircled by a plurality of axially spaced and aligned annular band means each having a narrow radial thickness, the combination comprising a pair of spaced apart substantially axially aligned end fitting means for sealing opposite ends of the tube, one of said fitting means having a fluid passageway therethrough, fluid pressure means connected with said passageway for providing fluid under pressure for forming the tube, a plurality of elongated rods extending between and operatively interconnecting said end fitting means for relative axial movement and for maintaining said end fitting means substantially in axial alignment, a plurality of ring means axially slidably supported by said rods, and a plurality of finger-like elements carried by each of said ring means for engaging one of said band means for holding said band means substantially in axial alignment with said end fitting means, said rods, ring means and finger-like elements being disposed entirely outside of spaces to be occupied by the corrugations so as to avoid substantial forming contact with the corrugations.

2. In an apparatus for hydraulically forming nodal-type corrugations in tubes, the combination comprising a pair of spaced apart substantially axially aligned end fitting means for sealing opposite ends of a tube, one of said fitting means having a fluid passageway therethrough, fluid pressure means connected with said passageway for providing fluid under pressure for forming the tube, each of said end fitting means including annular band means having a narrow radial thickness for closely encircling an end portion of the tube, a cylindrical member for insertion within the tube, said cylindrical member extending between and telescoping within the annular band means of said end fitting means, and means for adjusting the diameter of said cylindrical member so that said diameter may be reduced to facilitate insertion of the cylindrical member within the tube and so that the diameter may be increased so that the cylindrical member fits snugly within the tube for maintaining said end fitting means substantially in axial alignment.

3. An apparatus for forming corrugated tubing comprising means for sealing opposite ends of a tube to be corrugated, pump means, conduit means connecting said pump means and the interior of said tube for directing hydraulic fluid under pressure from the pump means into the tube, means for axially collapsing the tube, check valve means in said conduit means for preventing hydraulic fluid from returning to said pump means, accumulator means for receiving hydraulic fluid forced from said tube during axial collapsing thereof to prevent an undue build-up of pressure within the tube, and means including check valve means for permitting hydraulic fluid to flow freely into said accumulator means and for restricting flow of hydraulic fluid from the accumulator means.

4. In an apparatus for hydraulically forming a nodal-type corrugation in a tube closely encircled by annular band means having a narrow radial thickness disposed between opposite ends of the tube, the combination comprising a pair of spaced apart substantially axially aligned end fitting means for sealing opposite ends of the tube, one of said fitting means having a fluid passageway therethrough, fluid pressure means connected with said passageway for providing fluid under pressure for forming the tube, a plurality of elongated guide bars extending between said end fitting means and mounted with their axes substantially parallel to the common axis of said end fitting means, and means supported by said elongated guide bars for engaging said band means for holding said band means substantially in axial alignment with said end fitting means, said guide bars and said holding means being disposed entirely outside of a space to be occupied by the corrugation so as to avoid substantial forming contact with the corrugation, said holding means comprising a pair of rings slidably mounted on said bars, a plurality of radially projecting and adjustable finger-like elements on each of said rings for engaging said band means, and means connected with said finger-like elements for locking the finger-like elements in desired adjusted position.

5. In an apparatus for hydraulically forming a plurality of nodal-type corrugations in a tube closely encircled by a plurality of axially spaced and aligned annular band means each having a narrow radial thickness, the combination comprising a pair of spaced apart substantially aligned end fitting means for sealing opposite ends of the tube, one of said fitting means having a fluid passageway therethrough, fluid pressure means connected with said passageway for providing fluid under pressure for forming the tube, guide means extending between and operatively interconnecting said end fitting means for relative axial movement thereof and for maintaining said end fitting means substantially in axial alignment, and contact means carried by said guide means for relative axial movement thereon and including narrow contact elements in pressing engagement with the band means centrally with respect to the axial extent thereof to avoid substantial contact between the contact elements and the corrugations formed in the tube and operating to move in unison with and to continuously hold the band means in axial alignment with said end fitting means during formation of the tube corrugations.

References Cited in the file of this patent
UNITED STATES PATENTS

| | | |
|---|---|---|
| 349,718 | Hollerith et al. | Sept. 28, 1886 |
| 1,835,314 | Lord | Dec. 8, 1931 |
| 1,983,468 | Knab | Dec. 4, 1934 |
| 2,028,150 | Grant | Jan. 21, 1936 |
| 2,106,496 | Debor | Jan. 25, 1938 |
| 2,379,046 | Spahr | June 26, 1945 |
| 2,631,640 | Zallea | Mar. 17, 1953 |
| 2,684,103 | Lee | July 20, 1954 |

FOREIGN PATENTS

| | | |
|---|---|---|
| 98,096 | Germany | July 16, 1898 |
| 684,910 | France | Mar. 24, 1930 |